United States Patent Office 2,824,122
Patented Feb. 18, 1958

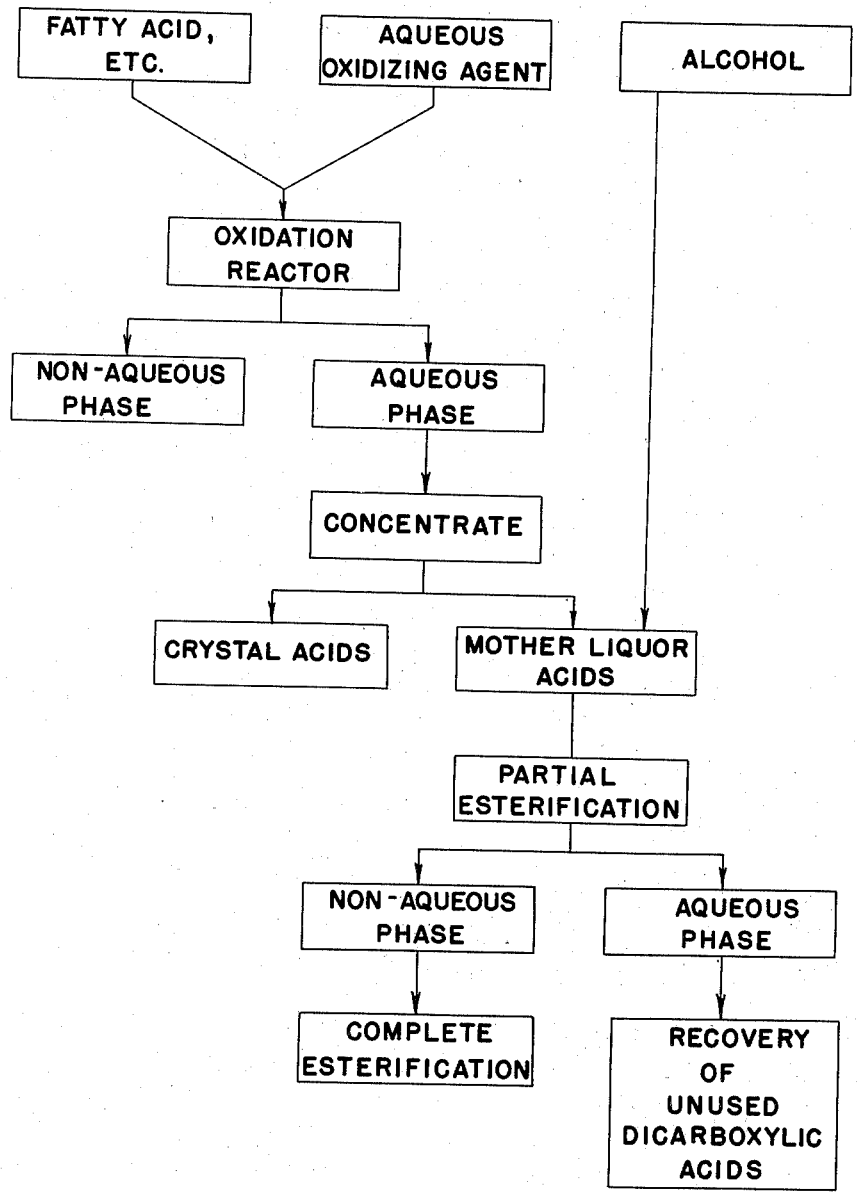

2,824,122
PURIFICATION OF ALPHA, OMEGA ALKANE-DIOIC ACIDS BY PARTIAL ESTERIFICATION

Vincent P. Kuceski, Park Forest, Ill., assignor to The C. P. Hall Company, Akron, Ohio, a corporation of Ohio Application May 24, 1955, Serial No. 510,770

7 Claims. (Cl. 260—485)

This invention relates to the esterification of dicarboxylic acids. More particularly, it relates to a process of esterification and purification in which esters are formed from aqueous organic acid solution obtained from the oxidation of a source material which is from the class consisting of saturated and unsaturated cyclic and acyclic hydrocarbons and oxygen-containing derivatives thereof, which hydrocarbons and derivatives contain at least 4 carbon atoms in a straight saturated chain. The aqueous solution also contains color bodies or other impurity.

The esterification is preferably carried out in a liquid layer of the reaction mixture formed by the alcohol which is immiscible with the aqueous layer containing the dicarboxylic acids which are to be esterified. During the esterification, using such alcohols, the less polar of these organic acids are transferred from the aqueous solution into the immiscible layer which contains alcohol, at a faster rate than the more polar acids. Thus the less polar organic acids are esterified first, leaving the more polar acids with the water-insoluble impurities in the aqueous phase. By the term "acid" hereinafter is meant organic dicarboxylic acids and monocarboxylic acids.

As the esterification progresses and acids are transferred from the aqueous phase, the reaction mixture is heated and water is evaporated, so that a high concentration of the acids is maintained in the aqueous layer. This increases the percentage content of the impurities therein. The esterification and concentration are terminated before the impurity content becomes so high as to seriously contaminate the esters in the immiscible layer, and this leaves unesterified acid in the aqueous layer, the esterification advantageously being terminated so as to effect a beneficial separation between the esterified acids and the unesterified acids remaining in the aqueous layer.

If the alcohol does not form an immiscible layer, the esterification takes place in a homogeneous layer and the esters which result form a water-immisicble layer. The acids are not separated before esterification and no separation of the acids takes place during esterification. It is only after the esterification that there is a separation, and this separation is a separation of the esters from the aqueous phase. Thus, the proportions of dicarboxylic acids to each other are about the same in the water layer as in the esters. For those alcohols which do not easily form an immiscible layer, an azeotroping agent may be used. These are non-polar substances, and ordinarily a cyclic or acyclic, saturated or unsaturated inert hydrocarbon or derivative thereof is employed, as, for example, toluene, xylene, etc.

The aqueous layer may be quite dilute. The process is applicable to the esterification of polar acids from aqueous solutions containing 40 or 50 percent (by weight) or more of such acids, and to less polar acids which may have a maximum solubility of only a few per cent in water, and may be present in solid form in excess of that soluble in the water.

The source materials from which the acids are derived include animal and vegetable fatty acids; a monoethenoic fatty acid, such as oleic acid, is preferred. Fatty acids low in rosin acids from tall oil, acidulated foots from cottonseed oil and soyabean oil, etc., as well as fatty acids from animal sources, greases, etc. form particularly desirable source materials. Other fatty acids that may be used include those from linseed oil, castor oil, cocoanut oil, lard oil, peanut oil, sunflowerseed oil, rapeseed oil, mustardseed oil, safflower oil, red oil, fish oil, fishliver oil, etc. Although fatty acids from such latter sources react chemically as indicated, they are usually too expensive to be used in this process. Cheaper fatty acids will ordinarily be employed even though they have a high content of linoleic acid. The glyceride and glycerine content should be low. Another source is petroleum hydrocarbons. Synthetic source materials may also be used, such as saturated and unsaturated cyclic and acyclic hydrocarbons and oxygenated derivatives thereof, including hydroxy and keto compounds (e. g., 9,10-octadecanediol, etc.), and cyclic hydroxy and keto compounds, such suitable synthetic sources being mixtures of such compounds constituting Oxo process residues and Fischer-Tropsch process oxygenated chemical residues.

Various oxidizing agents may be employed depending upon the starting material used. Thus, permanganates, chromic acid, ozone, air, oxygen, nitrous acid, and oxides of nitrogen greater than $N_2O$ are known as oxidizing agents for the oxidation of unsaturated fatty acids such as oleic acid, etc., to dicarboxylic acids and monocarboxylic acids. The same is true for the unsaturated hydrocarbons, except that when air is used as the oxidizing agent a high temperature and catalyst must be employed. If the starting material is an aldehyde, a ketone, or a hydroxy compound, such as is produced by the Oxo process or Fischer-Tropsch process, practically any of these oxidizing agents may be used. On the other hand, if the starting material is a saturated fatty acid or a saturated hydrocarbon, nitric acid is the only oxidizing agent which it is feasible to use under known oxidizing conditions. The predominant reaction with other oxidizing agents appears to be the formation of hydroxy compounds and peroxides without scission. Various catalysts have been employed, and this invention contemplates their use. In various of the reactions as, for example, in the oxidation of an unsaturated fatty acid, the various oxidizing agents will split the molecule at the double bond and produce one molecule of dicarboxylic acid and one molecule of monocarboxylic acid. Aqueous nitric acid is a preferred oxidizing agent which may be used alone or with air, oxygen, ozone, etc. Oxides of nitrogen, such as $NO_2$, $N_2O_4$, or other oxides above $N_2O$ may be used and in aqueous solution produce some nitric acid. Nitric acid and these oxides of nitrogen and also hydrogen peroxide and ozone form desirable oxidizing agents because they leave no residue.

Metal compounds derived from metal-containing oxidizing agents and catalysts may be separated in any convenient manner.

Thus the alcohol used in the esterification may be water-soluble or water-insoluble. The use of an insoluble organic azeotroping agent, such as xylene or toluene, will in some cases permit the use of an alcohol which might otherwise be miscible with the aqueous phase. Although the invention will be described more particularly with respect to the formation of isooctyl esters, other esters may be formed by using other alcohols. The alcohols used may be saturated or unsaturated, cyclic or acyclic, primary or secondary, but not tertiary. They may contain functional groups, including carbonyl groups, nitro groups, halogen groups, ester groups, sulfur, and ether groups. The alcohols include, for example, cyclohexanol, hexanol, normal butanol, undecanol, tridecanol, isoamyl alcohol, 2-ethyl hexyl alcohol, hexyl alcohol, alpha omega-aliphatic glycols, polyethylene glycols, polypropylene glycols, castor oil, hydrogenated castor oil, 1,6-dihydroxyhexamethylene, 1,3-dihydroxycyclohexane, 2-nitro-1-butanol, etc.

The accompanying flow sheet is included to assist in the disclosure of the invention.

The invention is described more particularly as carried out with the use of iso-octyl alcohol which is immiscible with the aqueous solution of dicarboxylic acids. The aqueous solution is boiled with the water-immiscible phase which contains the alcohol. During the preliminary part of the esterification, acid is dissolved from the aqueous phase into the non-aqueous or alcohol phase where it is eventually esterified. The composition of the non-aqueous phase is constantly changing during this preliminary stage of the esterification process. Some of it is vaporized as an azeotrope with water from the aqueous phase. This vapor is condensed, the water is separated, and the alcohol is advantageously returned to the reaction vessel, either continuously or intermittently. Fresh alcohol may be added to the non-aqueous phase, continuously or intermittently. A water-immiscible solvent, such as toluene, xylene, etc., may be added to this phase as an azeotroping agent. Some of the acid dissolved from the aqueous phase into the non-aqueous phase reacts with the alcohol and forms ester. Partial esters may be produced. As acid enters into the esterification process, and as the aqueous phase is concentrated by removal of water therefrom, more and more acid is transferred from the aqueous into the non-aqueous phase. The solution of the acid into the non-aqueous phase is selective depending upon the partition coefficients of the acids present in the aqueous phase. The formation of esters and their solution into the alcohol causes a constant change in the solvent characteristics of the non-aqueous phase. The water content of the non-aqueous phase may change by solution of water therein, or solution of water therefrom into the aqueous phase.

The immiscible phase is separated before the carboxylic groups contained therein are completely esterified. After separation the esterification is continued until it is complete. The immiscible phase which contains the partially esterified acid usually contains sufficient excess alcohol to complete the esterification. It may also contain unesterified acid which is completely esterified in the final stage of the process. It may be necessary to add alcohol to the partially esterified product in order to complete the esterification.

After the separation of the ester phase from the concentrated aqueous solution of the water-soluble materials (herein sometimes called "impurities"), including the more water-soluble dicarboxylic acids, metal salts, color bodies, etc., by decantation or some equivalent procedure, the esterification of the acids in the water-immiscible layer is completed by heating. An azeotroping agent may be added to facilitate removal of the water formed during the esterification, and thus speed up the reaction.

The following examples are illustrative:

EXAMPLE I

This example relates to the esterification of a mixture of acids such as may be obtained by the process of this invention from animal or vegetable fatty acids (e. g. oleic acid) using 25 percent nitric acid as the oxidizing agent, at a temperature of 130° C. with a dwelling time of 3 hours and a pressure corresponding to the vapor pressure of the mixture at that temperature. The composition of the dicarboxylic acids obtained will depend upon the source materials, the nitric acid concentration, the time of contact as well as the temperature and pressure. After the desired degree of completion the oxidized reaction mixture is allowed to separate into an aqueous phase and a non-aqueous phase. The aqueous phase is drawn off. Suitable extractions can be carried out with the non-aqueous phase to remove some or most of the dicarboxylic acids remaining dissolved therein. Such extracts can be added to the aqueous phase. The aqueous phase is then concentrated to about 50–60 percent solids with simultaneous removal of some nitric acid and cooled to crystallize the bulk of the higher molecular weight dicarboxylic acids such as sebacic, azelaic, and suberic acids. A considerable part of the adipic and the succinic acids crystallize also. The mixture of succinic, adipic, suberic, azelaic and sebacic acids are generally spoken of as the "crystal acids." These crystals may be processed as desired.

The filtrate from the crystal acids now contains most of the lower molecular weight acids, some of the higher molecular weight acids, some of the monocarboxylic acids, and some nitric acid. This is then concentrated to about 30 to 60 percent solids and steam-stripped to remove substantially all of the nitric acid. Column 1 of Table No. 1 shows such an analysis. The acids in this solution are generally spoken of as mother liquor acids. They contain about 1 percent each of nitric acid and ash. If desired, all of the nitric acid may be removed in order to avoid any oxidation by the nitric acid during the heating of the mixture and the removal of water. The desired higher dicarboxylic acids held in solution in the water by the other carboxylic acids, were removed and purified by esterification according to the process of this invention.

Eleven hundred parts of mother liquor containing 356.4 parts of mother-liquor acids as shown on Table 1 were placed in a vessel and 186 parts of isooctyl alcohol were added to it. The materials were then heated to boiling. Water was removed from the distillate and the lighter phase, which in this case was the alcohol, or non-aqueous phase, was returned to the reaction vessel. After 40 minutes, 214 more parts of isooctyl alcohol were added to the reaction vessel. During this time the aqueous phase below the isooctyl alcohol phase became more concentrated. The lower aqueous phase was dark in color. The color was at least in part attributable to iron and sodium impurities, and perhaps nitrate salts and other oxidation products. As the process proceeded the volume of the aqueous phase was reduced. When it reached about 90 parts (by weight) the dark-colored material from this aqueous layer started migrating into the upper layer. This upper phase contained not only the alcohol, but monocarboxylic and dicarboxylic acids dissolved into the alcohol and esters formed in the reaction. Upon dilution with a small amount of water and 5 parts of concentrated mineral acid the color returned to the lower or aqueous phase. The addition of the mineral acid facilitated the return and retention of the color in the aqueous phase, but is not absolutely necessary. Mineral acids such as sulfuric acid, nitric acid, phosphoric acid, etc., may be employed. Hydrochloric acid may also be used if it does not interfere in subsequent processing steps but ordinarily is not preferred because of its corrosive effect. During the esterificaiton a total of 670 parts of isooctyl alcohol were added to the reaction vessel.

The two phases were then separated, and after the separation, the upper or non-aqueous phase, which contained the isooctyl alcohol, monocarboxylic acids and their esters, and dicarboxylic acids and their mono- and diesters, together with a small amount of water, was heated to 100–140° C. until esterification was deemed to be complete.

An azeotroping solvent such as benzene, toluene, xylene, etc., may be added to the non-aqueous layer after separation from the aqueous layer, and before completion of the esterification. This facilitates esterification by aiding in the removal of the remaining water and the additional water formed during the esterification.

The mixed esters were then treated in the usual manner to remove acidic components by washing with warm water and with 5 percent aqueous sodium hydroxide solution which neutralized and removed acidic materials which were present. Instead of sodium hydroxide, other alkaline washes may be used, as, for example, sodium carbonate, sodium bicarbonate, potassium hydroxide, potassium carbonate, etc. The acidic materials so neutralized and removed include, for example, any unesterified dicarboxylic acids and monocarboxylic acids which were present, and the added mineral acid, etc. The wash with sodium hydroxide also removed color bodies from the alcohol layer. The alcohol-ester layer was finally washed with water. The unreacted isooctyl alcohol present was then removed by vacuum distillation.

The following table gives in the first double column the amount and percent of various acids present in the starting material, and in the second double column the amount and percentage of these acids present in the aqueous phase which was separated from the alcohol or non-aqueous phase before completion of the esterification. The amount shown as present in the esters was calculated by subtracting the figures in the second column from those in the first column. In the last column is shown the percent of each starting material which was removed by this process. This shows clearly that practically all of the suberic, azelaic, and sebacic acids were removed from the aqueous layer by the process of the invention.

in the starting material. Most of the succinic acid as well as a substantial amount of the glutaric, adipic and pimelic acids were retained in the aqueous phase, and suitable means of separating these acids are available. For example, they may be crystallized from water to obtain crystalline acids, or they may be purified of metallic contaminants and nitric acid, and lower molecular weight esters may be made from them. They may be dissolved in anhydrous solvents and certain purified crystal fractions can be obtained and used as such. The non-aqueous phase contained a substantial amount of the higher boiling dicarboxylic acids as well as the lower boiling dicarboxylic acids in ester form, and these were light in color and free from nitric acid and metal impurities.

EXAMPLE II

One hundred ten parts of an aqueous solution of the same percentage composition shown in column 1 of the preceding table and analyzing 46.7 percent of solids was boiled with 65 parts of isooctyl alcohol until about 35 to 45 parts of a dark aqueous phase remained. The two phases were separated and the upper phase was heated to complete the esterification. The esters obtained in this manner were analyzed for mono- and dicarboxylic acids and the following percentages obtained:

*Table No. 1*

| Composition | Starting Material | | Aqueous Layer | | Ester | | Percent Starting Acids Removed By Process |
|---|---|---|---|---|---|---|---|
| | Gms. | Percent | Gms. | Percent | Gms. | Percent | |
| Succinic | 81.7 | 22.93 | 58.6 | 58.5 | 23.1 | 9.02 | 28.27 |
| Glutaric | 85.2 | 23.90 | 20.7 | 20.6 | 64.5 | 25.20 | 75.7 |
| Adipic | 60.0 | 16.82 | 8.6 | 8.55 | 51.4 | 20.05 | 85.7 |
| Pimelic | 81.0 | 22.75 | 8.6 | 8.55 | 72.4 | 28.30 | 89.4 |
| Suberic | 16.8 | 4.71 | .25 | 0.2 | 16.55 | 6.47 | 98.6 |
| Azelaic | 20.4 | 5.73 | .25 | 0.2 | 20.15 | 7.87 | 98.8 |
| Sebacic | 0.3 | 0.08 | 0.0 | 0.0 | 0.3 | 0.12 | 100.0 |
| Mono-acids | 11.0 | 3.08 | 3.4 | 3.4 | 7.6 | 2.97 | 69.1 |
| Total | 356.4 | 100.00 | 100.4 | 100.0 | 256.0 | 100.00 | [1] 71.75 |

[1] This figure is an average, not a total.

The table shows that there were around 20 percent, more or less, of each of the lower water-soluble dicarboxylic acids, including succinic, glutaric, adipic and pimelic acids and some monocarboxylic acids present in the starting material. These and other analyses herein were made by chromatographic separation as described by T. Higuchi et al., in Anal. Chem., vol. 27, page 491 (March 1952). There was a considerable percentage of suberic and azelaic acids present in the original starting material. By esterifying with the water-insoluble alcohol, substantially all of the suberic and azelaic acids as well as the small amount of sebacic acid were transferred to the alcohol layer. These are the less polar acids. Here they were each present in greater percentage concentration in the partially esterified ester than, as acids,

*Table No. 2*

| Acids | Starting Material | | Aqueous Layer | | Ester | | Percent Starting Acids Removed By Process |
|---|---|---|---|---|---|---|---|
| | Gms. | Percent | Gms. | Percent | Gms. | Percent | |
| Succinic | 11.17 | 22.93 | 10.87 | 27.43 | 0.30 | 3.28 | 2.70 |
| Glutaric | 11.67 | 23.90 | 11.52 | 29.08 | 0.15 | 1.64 | 1.25 |
| Adipic | 8.20 | 16.82 | 7.79 | 19.68 | 0.41 | 4.48 | 5.00 |
| Pimelic | 11.10 | 22.75 | 7.79 | 19.68 | 3.31 | 36.20 | 29.8 |
| Suberic | 2.29 | 4.71 | 1.14 | 2.88 | 1.15 | 12.57 | 50.3 |
| Azelaic | 2.79 | 5.73 | 0.51 | 1.28 | 2.28 | 24.90 | 81.7 |
| Sebacic | 0.04 | 0.08 | 0.00 | 0.00 | 0.04 | 0.43 | 100.00 |
| Mono-Acids | 1.51 | 3.08 | 0.00 | 0.00 | 1.51 | 16.50 | 100.00 |
| Total | 48.77 | 100.00 | 39.62 | 100.03 | 9.15 | 100.00 | [1] 18.75 |

[1] This figure is an average, not a total.

Even though only 18.75 percent (last column) of total amount of acids had been solubilized and esterified at the time the foregoing reaction was stopped, all of the monocarboxylic acids and all of the sebacic acid had been separated, while only 2.70 percent of the succinic acid, only 1.25 percent of the glutaric acid, and only 5.00 percent of the adipic acid had been esterified. Thus the less polar acids, namely, the monocarboxylic acids and the higher molecular weight dicarboxylic acids, showed a marked tendency to leave the water phase and enter the alcohol phase with partial esterification, while the reverse is true for the lower molecular weight acids. The ester layer was light colored and clear. The impurities were concentrated in the aqueous layer.

The esterification of Example I had progressed to 71.75 percent of the total, hence the effect on the lower molecular weight acids is more marked in Example I than in Example II because the esterification proceeds progressively from the less polar to the more polar dicarboxylic acids.

Columns 2 and 4 of Table No. 2 show that monocarboxylic acids may be removed completely from the aqueous layer to the ester layer. The resulting aqueous solutions of dicarboxylic acids are free from monocarboxylic acids. They can be converted to the esters or utilized as such preferably after treatment to remove organic and inorganic contaminants. In particular, such mono-free dicarboxylic acids find use in the manufacture of high polymers where the presence of monocarboxylic acids is not desired, and, in fact, operate to decrease the formation of long chain polyesters. The deleterious effect of the presence of monocarboxylic acids in the manufacture of polyesters is well known to those skilled in the art.

Bearing in mind that both ester products of the examples were obtained from the same dicarboxylic acids, it is noted that the composition of the ester product obtained in any process depends upon the time and temperature of the reaction and the amount of water removed from the aqueous phase before the separation of the two phases. If all of the water were removed the two phases would disappear and there would be no fractionation of the carboxylic acids and the impurities would remain with the esters.

Vaporization reduces the total water in the system but particularly in the aqueous phase. This tends to favor the partition of more of the dicarboxylic and monocarboxylic acids into the alcohol phase. Generally, the less water-soluble acids will go into an immiscible alcohol phase at a faster rate than the more soluble acids. This results in a dynamic situation in which the polarity of the alcohol phase may rise or fall, depending on the amount of acid and water dissolved in the alcohol phase and the extent of esterification. At first the polarity of the alcohol phase rises owing to the higher molecular weight acids becoming dissolved in it. This increase in polarity allows the alcohol layer to dissolve more carboxylic acids. At the same time, esterification takes place, using up the relatively polar hydroxyl groups and replacing them with the relatively non-polar ester groups. This tends to decrease the polarity of the alcohol phase.

Another factor which allows esterification to take place is the enhanced solubility of the normally immiscible alcohols in concentrated aqueous solutions of the dicarboxylic acids. Esterification can then take place in the aqueous phase without fractionation or separation of the higher molecular weight acids. This emphasizes the fact that when fractionation is desired, high concentration of dicarboxylic acids in the aqueous phase must be avoided not only because impurities may then migrate into the non-aqueous layer, but because indiscriminate esterification may also take place.

During the esterification of this process some of the water from the water phase is vaporized. If all of it is vaporized some water is added to the resulting ester to effect the separation of the water-soluble impurities. If impurities are allowed to remain in contact with the ester-alcohol layer too long they may form color bodies which are difficult to remove. The separations are effected by retaining sufficient of the aqueous phase in contact with the non-aqueous phase. The water phase should not be reduced in volume to the point where impurities migrate in any substantial quantity from the aqueous phase into the non-aqueous phase.

The examples refer to esterification with a water-immiscible alcohol. If water-miscible alcohols (such as methyl, ethyl, and propyl alcohols) are used, only one phase is present until the ester is formed. Esterification with the lower boiling alcohols necessitates special handling also because of their low boiling points. They vaporize with the water on boiling. It is necessary to use a large excess of alcohol or add alcohol continuously or at intervals to take the place of that which has vaporized.

The examples are illustrative. The invention is defined in the claims which follow.

What I claim is:

1. The process of esterifying a less polar alpha, omega-alkanedioic acid in the presence of a more polar alpha, omega-alkanedioic acid in an aqueous solution, with an alcohol in an immiscible layer in contact with the aqueous layer, which comprises effecting partial esterification with loss of water, the less polar acid thereby esterifying in preference to the more polar acid and the partial ester of said less polar acid as formed dissolving into the alcohol layer, separating the layers, and thereafter effecting more complete esterification of the less polar acid.

2. A process of purifying alpha, omega-alkanedioic acids which comprises heating the aqueous phase obtained by the aqueous nitric acid oxidation of source materials of the class consisting of hydrocarbons and oxygenated derivatives thereof which hydrocarbons and derivatives contain at least four carbon atoms in a straight chain, with an alkanol and vaporizing water, and producing a water-immiscible partial-ester phase containing esters of the less polar alpha, omega-alkanedioic acids and a water phase containing impurities and more polar alpha, omega-alkanedioic acids, and then mechanically separating the two phases.

3. A process of effecting a partial separation of a mixture of alkanoic acids and alpha, omega-alkanedioic acid homologs obtained by the oxidation of source materials of the class consisting of hydrocarbons and oxygenated derivatives thereof, which hydrocarbons and derivatives contain at least four carbon atoms in a straight chain, which comprises heating an aqueous phase therefrom with an alkanol and thereby vaporizing water therefrom and producing a water-immiscible partial-ester phase containing esters of at least one alkanoic acid and of the less polar alpha, omega-alkanedioic acids and a water phase containing impurities and more polar alpha, omega-alkanedioic acids and then mechanically separating the two phases and completing esterificiation of partial esters in the water-immiscible phase.

4. The process of claim 2 in which the alkanol is a butyl alcohol.

5. The process of claim 2 in which the alkanol is an amyl alcohol.

6. The process of claim 2 in which the alkanol is an octyl alcohol.

7. A process of effecting partial separation of alpha, omega-alkanedioic acids of different polarity from an aqueous solution of such acids which are adjacent homologs which process comprises heating the solution with an alkanol and evaporating water therefrom and producing a water-immiscible partial-ester phase containing esters of the less polar acids and a water phase containing the more polar acids, and then mechanically separating the two phases and completing the esterification of acids in the ester phase.

References Cited in the file of this patent

UNITED STATES PATENTS

| | | |
|---|---|---|
| 2,203,680 | Ellingboe | June 11, 1940 |
| 2,560,156 | Cavanaugh et al. | July 10, 1951 |
| 2,571,194 | Brothman | Oct. 16, 1951 |
| 2,729,665 | Buckmann | Jan. 3, 1956 |
| 2,742,495 | Nawiasky | Apr. 17, 1956 |

OTHER REFERENCES

Patrick et al.: Ind. Eng. Chem. 41 (1949), pp. 636–41.